United States Patent

[11] 3,620,880

| [72] | Inventor | Jerome H. Lemelson<br>85 Rector St., Metuchen, N.J. 08840 |
|---|---|---|
| [21] | Appl. No. | 813,928 |
| [22] | Filed | Apr. 7, 1969 |
| [45] | Patented | Nov. 16, 1971 |
| | | Continuation-in-part of application Ser. No. 500,731, Oct. 22, 1965, now Patent No. 3,436,816, which is a continuation-in-part of application Ser. No. 241,804, Dec. 3, 1962, now Patent No. 3,276,513. This application Apr. 7, 1969, Ser. No. 813,928 |

[54] APPARATUS AND METHOD FOR PRODUCING COMPOSITE MATERIALS
9 Claims, 4 Drawing Figs.

[52] U.S. Cl. ............................................. 156/384,
29/470.1, 156/383, 156/555
[51] Int. Cl. ............................................. B32b 3/10,
B41m 1/26
[50] Field of Search ........................................... 156/384, 555, 385, 387, 388, 383; 29/470.1, 497.5; 72/224, 225, 256

[56] References Cited
UNITED STATES PATENTS

| 1,543,200 | 6/1925 | Ball ........................ | 101/23 |
| 1,742,363 | 1/1930 | Martinek ................... | 101/23 |
| 2,372,617 | 3/1945 | Trew ........................ | 156/252 |
| 2,639,660 | 5/1953 | Sunderhauf et al. ........ | 101/23 |
| 2,701,483 | 2/1955 | Foxon et al. ............... | 29/475 |
| 2,817,618 | 12/1957 | Hahn ....................... | 156/209 |
| 2,917,217 | 12/1959 | Sisson ....................... | 138/103 |
| 246,407 | 8/1891 | McTighe .................... | 29/470.1 |
| 2,133,441 | 10/1938 | Fischer ..................... | 154/1 |
| 2,693,121 | 11/1954 | Dight ....................... | 29/497.5 |
| 3,093,530 | 6/1963 | Lippman ................... | 156/383 |

*Primary Examiner*—Benjamin A. Borchelt
*Assistant Examiner*—G. E. Montone

ABSTRACT: An apparatus and method for producing composite materials and the materials made thereof are provided. In one form, one or more sheet metal materials are continuously extruded to shape and are combined with a core material in a rolling mill to provide a composite structure having improved characteristics imparted thereto by both core and encapsulating materials. The core material may comprise a plurality of reinforcing elements such as filaments, wires, whiskers or a grid fed to the bite of two extruded sheets or otherwise formed shapes which are made to flow over and around the reinforcing elements and to encapsulate same therebetween as the two sheets are roll bonded or welded together and reduced in thickness to form a third composite sheet formation thereof.

In another form, individual articles are disposed on top of a first freshly extruded sheet and are encapsulated in a composite sheet formed of said first sheet and a second sheet disposed thereagainst and roll bonded thereto in a rolling mill. The oxide free, high-temperature condition of the two sheets, as extruded, is utilized to fabricate improved composite sheet materials without the difficulties normally experienced in fabricating sheet materials from cold stock.

PATENTED NOV 16 1971 3,620,880

INVENTOR.
JEROME H. LEMELSON

APPARATUS AND METHOD FOR PRODUCING COMPOSITE MATERIALS

RELATED APPLICATIONS

This is a continuation-in-part of application Ser. No. 500,731 filed Oct. 22, 1965, now U.S. Pat. No. 3,436,816 for Method of Making Heat Transfer Panelling which was a continuation-in-part of Ser. No. 241,904 filed Dec. 3, 1962 now U.S. Pat. No. 3,276,513 having as a parent application Ser. No. 519,014 filed June 28, 1955 for Welding Techniques, now abandoned and copending application Ser. No. 393,292 filed Aug. 31, 1964, for Automatic Manufacturing Apparatus having as a parent application Ser. No. 703,523 filed Dec. 18, 1957, and now U.S. Pat. No. 3,146,492.

SUMMARY OF THE INVENTION

This invention relates to an apparatus and method for producing composite materials and in particular composite sheet materials formed from one or more extrusions as extruded.

Certain nonferrous metals such as aluminum and its alloys, zinc and other white metals are substantially weak in structure or incapable of supporting loads per se. While aluminum has been clad onto steel, welded laminates of aluminum and steel or other reinforcing means have not been successfully fabricated due to the difficulty in welding aluminum to itself and other metals as a result of the oxide coating or film formed thereon immediately after it is formed to shape. The instant invention is concerned with apparatus and methods for fabricating composite materials of nonferrous metals such as aluminum and white metals and reinforcing elements such as wires or grids encapsulated within the nonferrous metal for reinforcing same. Accordingly it is a primary object to provide a new and improved apparatus and method for fabricating composite materials such as sheets and plates of two different metals.

Another object is to provide an apparatus and method for fabricating a plurality of different metals including at least one which is easily oxidized to form an oxide film or coating on its surface which inhibits welding or roll bonding and means for fabricating same prior to the formation of said oxide film so that the effects of oxidation will not interfere with the fabrication or joining of the metal.

Another object is to provide a method for simultaneously roll bonding aluminum to itself and welding it to another metal such as steel without difficulty.

Another object is to provide an apparatus and method for continuously producing internally reinforced metal sheet to improve its strength and facilitate fastening thereto.

This invention is concerned with the automatic and continuous manufacture of composite structures such as sheet and plate or slablike material contained embedded therein a plurality of filaments or wires such as conductors or reinforcing members extending through the center or outer stratum of the sheet. While the drawings define extrusion means for supplying one or more of the components of the composite sheet such as the major portion of the sheet material, it is to be noted that continuous casting means may also be employed. While the invention is concerned with the manufacture of composite metal sheet materials, modified forms of the apparatus and methods described herein may also employ ceramic and plastic materials which are continuously extruded to shape and worked as described. Furthermore, while the embedded material is defined primarily as a screen grid or grating of metal wires, it may also comprise a plurality of parallelly extending and continuously fed wires of metal, whiskers or metal crystals, polymers or filaments of high strength carbon.

Figure 1:
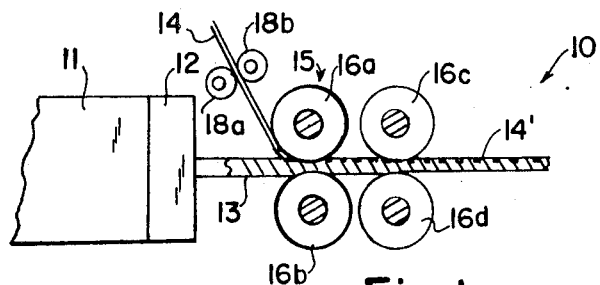
FIG. 1 is a side view with parts broken away for clarity of an apparatus for forming composite sheet material.
Figure 2:
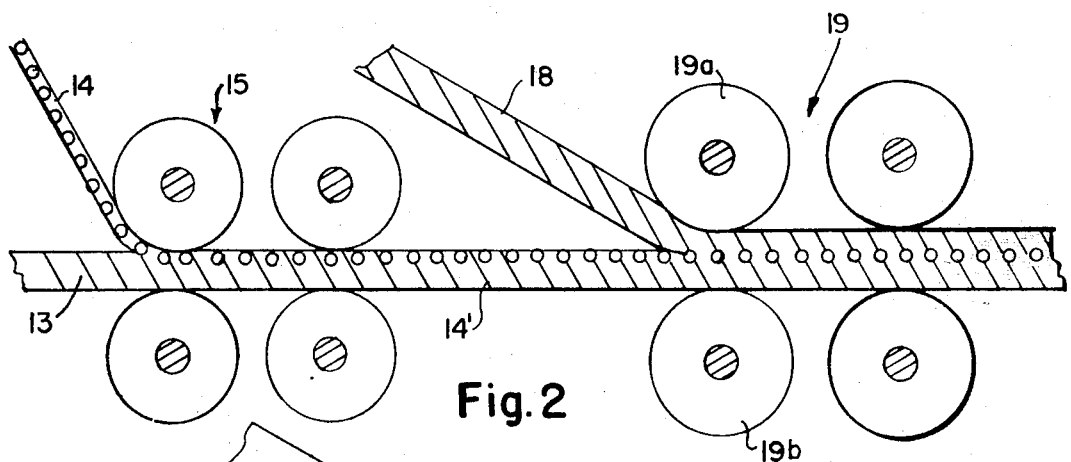
FIG. 2 is a side view with parts broken away for clarity of a modified form of a portion of an apparatus of the type shown in FIG. 1.

In FIG. 1 is shown an apparatus 10 for continuously forming composite sheet material or structural elements and comprising an extruder 11 operative for continuously forming a sheet 13 of metal such as aluminum through an extrusion die 12 and feeding same to the bite of rolls of a rolling mill 15. Fed downwardly from a supply coil or other means is a screen or grid 14 of metal driven by powered rollers 18a and 18b to the bite of the front rolls 16a and 16b of the rolling mill 15, which as shown in FIG. 2 operates to compress the screen elements into the freshly formed extrusion 13 so that said elements or grid become encapsulated within the upper stratum of the extrusion 13 as shown in FIG. 2. The resulting composite extrusion 14' may be utilized per se as a grid or screen reinforced sheet or may be further processed as shown in FIG. 2 by continuously feeding or extruding a second sheet material 18 against the surface of sheet 14' containing the screen 14 and compressing the new composite assembly between the rolls 19a and 19b of a second rolling mill 19 to form a unitary structure of the two extrusions and the grid or screen 14 which becomes centrally embedded therein. If the sheets 14 and 18 made of metal which is pressure weldable such as aluminum, they may be pressure roll bonded together by the rolling mill 19 which operates to molecularly bond the metal of the two sheets to form a unitary structure thereof. Notations 16a to 16d refer to the rolls of mill 15 which are power rotated and it is assumed that a suitable driving means is provided for the rolls 19a and 19b of mill 19. The grid 14 may also be replaced by separate wires or filaments of metal or other suitable material extending parallel to each other and the longitudinal axis of the sheet 14. Electrically conducting wires or grid formations coated with insulating material as defined in parent application Ser. No. 500,731 may also be employed for the core material 14 to be used for conducting electrical energy through the composite sheet and or as resistance heating elements.

Figure 3:
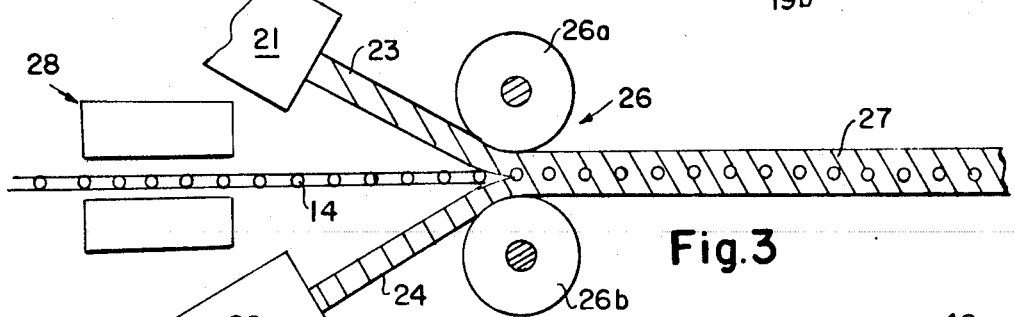
FIG. 3 is a side view with parts broken away for clarity of another form of the composite sheet-forming apparatus of FIG. 1.

In FIG. 3 two extruders 21 and 22 are mounted one above the other and operate to supply respective sheets or structural shapes 23 and 24 to the bite of a rolling mill 26. Between the extruders 21 and 22 and sheets 23 and 24 is fed a screen, grid or parallel array of wires or filaments 14 of the type described which flow or are driven between said sheets where they converge at the first rolls 26a and 26b of the rolling mill. The rolling mill 26 serves to compress the sheet materials 23 and 24 to flow over and around the elements of 14 and become roll bonded to each other as described to form a composite and unitary structure thereof. During the procedure of encapsulating the screen or filaments 14 between the two sheets and the roll bonding of said sheets together, the sheets are reduced in thickness preferably without changing the cross section or shape of the core member or members 14. If the sheets 23 and 24 are immediately fed to the rolling mill 26, an oxide of the metal will not have an opportunity to form on the surfaces thereof and, combined with the high temperature of the metal resulting from the extrusion process, conditions will be such as to permit the fabrication of a composite sheet material 27 without the difficulties which would be experienced if the encapsulating material were to be formed of cold coiled sheets of metal which contain an oxide layer or film.

For certain improved composite structures, it may be desirable to weld or fuse the sheet material to the filaments, wires or screening 14 encapsulated therein. If the material comprising core means 14 is steel and the extruded material is aluminum, then an induction heating means 28 may be disposed between the extruders 21 and 22 for heating member or elements 14 as said core material is fed to the bite of the two sheets 23 and 24. The induction heating means may be operative to heat the core material 14 above the melting point of the encapsulating material. If the encapsulating material comprising sheets 23 and 24 is aluminum, then heating the core material 14 above the melting point of aluminum will be operative to effect welding of the freshly extruded aluminum to the core material. Accordingly, the core member 14 may be welded to the encapsulating material simultaneously as it is roll bonded to itself, that is, the two sheets 23 and 24 of aluminum are compressed together around the core member and welded to each other. It is also noted that a suitable induction heating means may be disposed in the apparatus of FIG. 1 to heat the grid or wires 14 prior to bringing same in contact with the sheet 13 to effect welding of the two materials together when they are combined as shown in FIG. 2. The induction heating means may also be disposed between stages of the rolling mills described and/or beyond same to heat the core material to a temperature while it is encapsulated within the sheet material so as to weld the materials together and facilitate the roll bonding process. For example, induction heating the core material will result in the transfer of a substantial amount of heat therefrom to the encapsulating material surrounding same which may be operative to soften the encapsulating material thereby facilitating or improving the roll bonding process.

Figure 4:
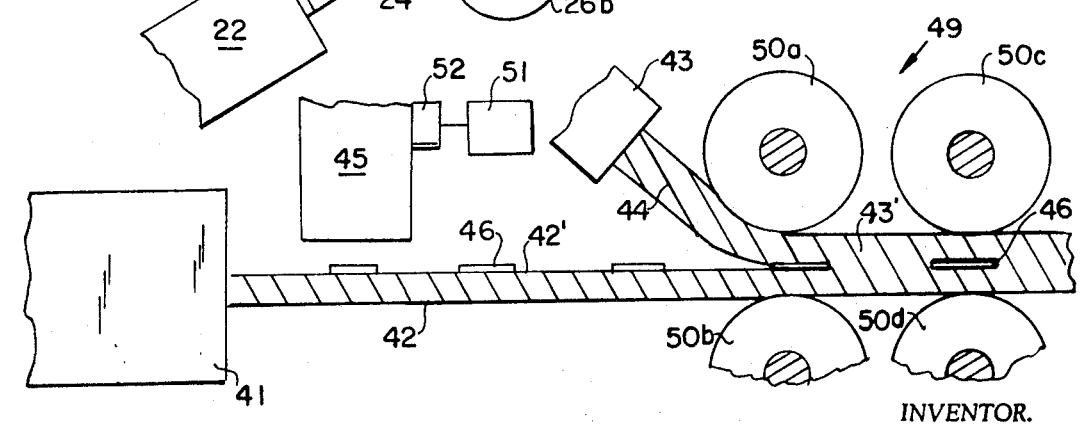
FIG. 4 is a side view with parts broken away for clarity of an apparatus for forming composite sheet material having particles disposed between the surfaces of the composite sheet.

FIG. 4 illustrates a modified form of the invention whereby two sheets or otherwise shaped members 42 and 44 of metal, plastic or ceramic materials which are capable of being pressure welded or bonded together are simultaneously formed by respective extruders 41 and 43 and fed to the bite of a rolling mill 49 comprising a plurality of pressure rolls denoted 50a, 50b, 50c, 50d, etc. which are power operated and serve to compress and weld the two sheets together as described. Notation 45 refers to a device which is automatically operative to dispose a plurality of articles at predetermined spaced apart intervals on the upper surface of sheet 42 which articles become encapsulated within the composite material formed in the rolling mill 49. If the sheets 42 and 44 are metal such as aluminum, the inserted objects 46 may comprise reinforcing inserts or retainers made of steel or other suitable metal. The inserted articles 46 may be flat pieces of metal or strips encapsulated between sheets 42 and 44 when the composite material is made thereof and serving as retaining means for fasteners such as screws and other devices mechanically held or welded to the sheet or inserted objects when articles are fabricated of the resulting composite material. The inserted objects 46 may have holes extending therethrough and, in certain instances, may be threaded to receive and retain fasteners in assembly with the composite sheet. As described above, the inserted objects 46 may be merely encapsulated within the material of the composite sheet made from sheets 42 and 44 or may be welded or fused thereto by induction heating or other means.

In a modified form of the embodiment illustrated in FIG. 4, freshly extruded sheets 42 and 44 may comprise plastic or metal materials capable of being pressure welded or roll bonded together in the rolling mill 49 immediately after extrusion and the placement of the inserts 46 on the upper surface 42' of the extruded sheet 42 by the positioning or dispensing means 45 may be program controlled so as to predeterminately locate said inserts within the composite sheet 43' formed thereof in said rolling mill. Later or further down the line when the sheet 43' is cut to predetermined lengths, if the cutting means is automatically or predeterminately operated to cut the sheet 43' along predetermined locations thereof, the inserts 46 within each cut length will be predeterminately located and may serve to enhance or effect fastening of the cut lengths to other members by means of fasteners penetrating the cut lengths of sheet and the inserts 46 encapsulated within said sheet. Accordingly an automatic controller 51 such as a multicircuit timer, digital computer or other means 51 is utilized to control operation of a motor or solenoid 52 which is associated with the dispensing means 45 for inserts 46 and controls their operation thereof to release an insert or inserts in response to signals generated by the controller 51. The controller 51 may also be operative to control operation of the means for cutting predetermined portions of the composite material 43' so as to assure that one or more of the inserts 46 will be predeterminately located in each cut section of said composite sheet 43', or to control the operation of a marking means operative to provide marks or embossings in either or both surfaces of the composite sheet 43' in alignment with each insert for locating same thereafter.

The inserted articles 46 may also comprise strips of metal, filaments, wires, whiskers or otherwise shaped material which is intermittently disposed against selected sections of the sheet 42 in the same or different quantity so as to reinforce selected sections of the composite sheet 43' which selected sections become predetermined portions of articles of manufacture requiring such reinforcement for strength or fastening purposes without the same requirements being applied to other portions of the articles defined by other portions of the sheet 43'. In other words, the inserted material may be composed of stampings, castings, moldings, short sections of wire, filaments, or other material which are predeterminately dispensed against the sheet 42 for predeterminately reinforcing same.

In yet another form of the invention, if the sheets 42 and 44 are composed of plastic materials such as clear thermoplastic polymers coextruded and heat sealed together, the articles or inserts 46 disposed onto the lower sheet 42 may comprise decorative material, reinforcing inserts or articles to be encapsulated or packaged between the two sheets. In a particular form, the rolls 50a and 50b may be operative to roll bond or weld only border portions of the sheets 42 and 44 while the rolls 50c and 50d may be operative to cross weld line or band portions of the sheets between one or more of the dispensed articles to form separate envelopes containing one or more articles packaged in each after which one or more of said enveloped may be automatically cut from the composite material 43' as described above; the automatic control means 51 being operative to control the dispensing and cut off means as described.

The units 46 of inserted material may also comprise deposited particles, droplets or vapor which is selectively applied to selected areas of sheet 42 prior to encapsulation. It may comprise metal film, vapor or electrical circuit components.

In yet another form of the invention, rolls 50c and 50d may comprise components of a printing press operative to selectively print material onto the outer surface of the composite material 43' in registration with the material disposed between the sheets.

I claim:

1. Apparatus for forming composite materials comprising:
   a. first means for continuously providing and conveying a first sheet of material,
   b. second means for continuously providing and conveying a second sheet of material,
   c. third means for feeding a third material composed of a plurality of longitudinally separated portions extending laterally between said first and second sheet materials,
   d. fourth means operative to receive, compress together and cause the flow of at least one of said first and second materials over and around said plurality of longitudinally separated portions of said third material and to integrally bond together the portions of said first and second materials between said longitudinally separated portions of said third material so as to form a composite and unitary material thereof which is solid throughout its entire cross section and is of constant thickness and to encapsulate and separate portions of said third material within the material formed from said first and second sheet materials.

2. Apparatus in accordance with claim 1 whereby said first and second materials are pressure weldable metal and said third material is a metal substantially stronger than said first and second materials and operative to reinforce the composite material, said fourth means comprising a rolling mill operative to deform said first and second sheets to cause same to flow over and around said third material as said materials are fed and to molecularly weld said first and second materials together.

3. Apparatus in accordance with claim 2 whereby said third material is composed of steel screening.

4. Apparatus in accordance with claim 1 whereby said third material is composed of a plurality of substantially flat reinforcing inserts and said third means is operative to selectively locate said inserts between said first and second materials.

5. Apparatus in accordance with claim 1 including automatic control means for predeterminately controlling operation of said third means to selectively dispense said third material between said first and second materials prior to passing same to said fourth means.

6. Apparatus in accordance with claim 1 including means for selectively dispensing said third material between said first and second materials, and printing means for selectively printing indicia on the surface of said composite material in registration with the selectively applied third material encapsulated within said composite material.

7. Apparatus in accordance with claim 1 whereby one of said first and second materials is composed of a clear plastic material, means for operating said third means to predeterminately dispose said decorative material against the surface of one of said first and second sheet materials and a printing means operative to selectively print material onto the outer surface of said clear plastic material in registration with the third material disposed between said first and second sheets.

8. Apparatus in accordance with claim 7, said third means being operative to predeterminately dispense separate units of said third material between said first and second sheets.

9. Apparatus in accordance with claim 8 including a program control means for controlling the operation of said third means to predeterminately dispense said third material between said first and second sheets so as to predeterminately locate said units within said composite material.